March 9, 1965     H. K. WEST     3,172,386
CAN MANUFACTURING METHOD
Filed Dec. 28, 1962
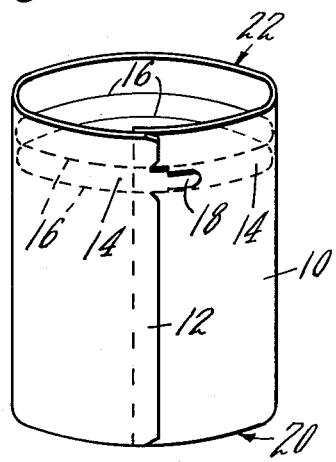
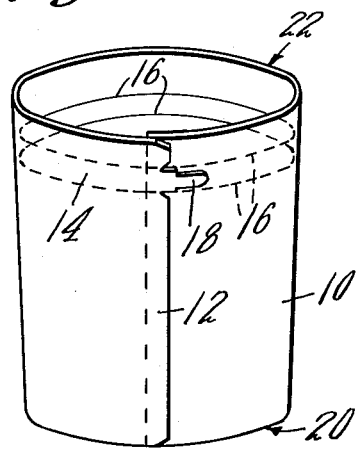
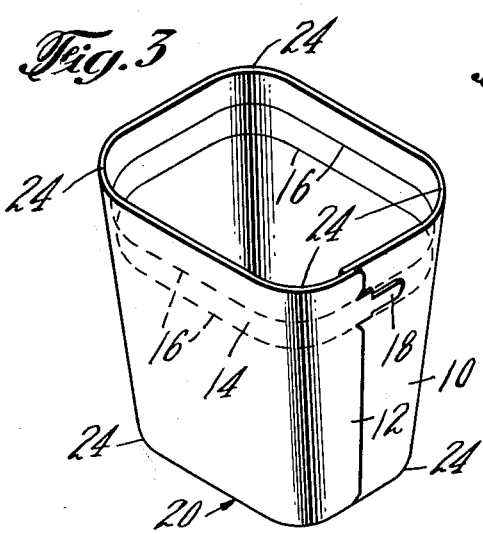
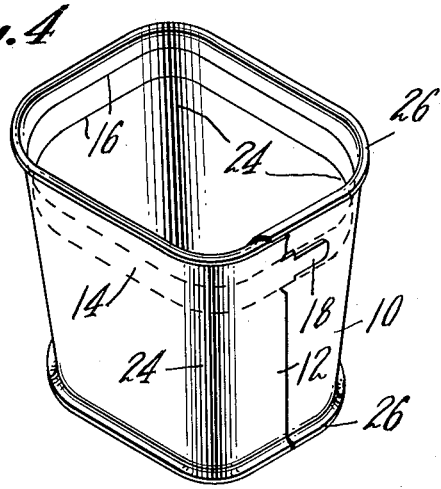
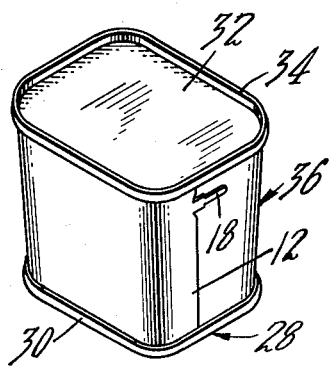
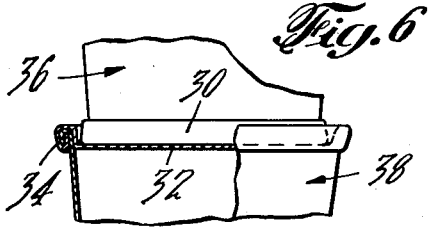
INVENTOR.
HARRY KENNETH WEST
BY George P. Ziehmer
George W. Reiber
ATTORNEYS

United States Patent Office 3,172,386
Patented Mar. 9, 1965

3,172,386
CAN MANUFACTURING METHOD
Harry Kenneth West, New Rochelle, N.Y., assignor to American Can Company, New York, N.Y., a corporation of New Jersey
Filed Dec. 28, 1962, Ser. No. 247,982
1 Claim. (Cl. 113—120)

The present invention relates to metal can manufacture, and has particular reference to a method of forming tapered, rectangular can bodies from round can bodies.

There are a number of products which have traditionally been packed in cans having rectangular, tapered bodies and which many consumers will not accept when packed in round, cylindrical cans, for reasons best known to themselves. This is rather unfortunate, since the round, cylindrical cans, being made from flat rectangular body blanks, are very well adapted for manufacture by high speed automatic can making equipment, whereas tapered cans, which are presently made from non-rectangular flat body blanks, are not and have heretofore been made on much slower, semi-automatic equipment. As a result, the tapered cans are substantially more expensive than the round cans, and the cost of the packaged product to the ultimate consumer is correspondingly higher.

The present invention seeks to rectify this situation by providing a method of making rectangular, tapered can bodies at lower cost than has heretofore been possible. The invention contemplates that the bodies be initially produced as round bodies on the high speed equipment, and then reshaped from their round, cylindrical shape to the desired tapered, rectangular shape in two reshaping steps. In the first of these reshaping steps, the rounded bodies are subjected to a stretching operation wherein the metal of the bodies is uniformly stretched to produce round tapered can bodies.

Thereafter, in a second reshaping step, the tapered, round can bodies are subjected to a reforming operation, without stretching of the metal, to reform them in the finally desired tapered, rectangular shape. As an auxiliary step, simultaneously with, or shortly after this reforming operation has been effected, the ends of the tapered, rectangular bodies are flanged outwardly to hold the bodies in this finally desired shape until their bottom and top ends are seamed in place.

Thus, there are produced cans which have the desired rectangular, tapered configuration and which can be made at substantially lower cost than are those which are made in the conventional manner.

An object of the invention, therefore is the provision of a method of making tapered cans at lower cost than the presently used methods.

Another object is the provision of a method of making tapered, rectangular can bodies wherein the bodies are initially made round and are then subjected to reshaping operations which give them the finally desired tapered, rectangular configuration.

Still another object is the provision of a method of reshaping can bodies wherein a metal stretching step is effected while the bodies are still round, so that uniform stretching is obtained.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of a round, cylindrical can body which is to be reshaped into a tapered, rectangular can body by the instant method invention;

FIG. 2 is a perspective view of the can body after it has been stretched from the round, cylindrical shape of FIG. 1 to a round, tapered shape in the first reshaping step of the instant invention;

FIG. 3 is a perspective view of the can body after it has been reformed from the round, tapered shape of FIG. 2 to the finally desired rectangular, tapered shape;

FIG. 4 is a perspective view of the can body of FIG. 3, after its ends have been flanged;

FIG. 5 is a perspective view, on a reduced scale, of a finished can embodying the can body of FIG. 4; and FIG. 6 is a side elevation of the top and bottom portions of a part of tapered, rectangular cans, identical to the can of FIG. 5, which are stacked one upon the other.

As a preferred and exemplary embodiment of the instant invention, the drawing discloses a method of reshaping a cylindrical can body 10, which is round in cross-section, to produce a tapered can body which is substantially rectangular in cross-section.

The round, cylindrical can body 10 which is illustrated in FIG. 1, may be formed in the usual manner from a substantially rectangular, flat sheet metal blank on the high speed automatic can making equipment which is normally used to produce this type of body. In the course of this body forming operation, the flat body blank is bent into cylindrical shape, and its longitudinal side edges are secured together to form a longitudinally extending side seam 12.

In order to prevent rupture or other failure of the side seam 12 during the ensuing reshaping steps of the instant invention, the side seam 12 should be of a type which is very resistant to disruption when subjected to shearing stresses. One suitable type of seam suitable for the side seam 12 is a fully welded lap seam which may be formed by the method disclosed in United States Letters Patent 2,204,549, issued on June 18, 1940, to John H. Murch, and entitled Method of Forming Metallic Containers. Other methods of forming suitable welded side seams may of course be employed.

Another type of seam which is suitable for use as the side seam 12 is a soldered lap seam wherein the opposite edge portions of the can body 10 are overlapped a suitable distance to provide a soldered lap seam having the necessary assistance to shear. An overlap of about one-quarter inch, when the body 10 is made from tinplate, has been found to be suitable. If desired, the solder bond may be reinforced by a plurality of longitudinally spaced spot welds, which are preferably made before the seam is soldered and which thus serve to hold the overlapped side seam edges in position during the soldering operation. A side seam of this type is illustrated in United States Letters Patent 1,542,663, issued to Julius Brenzinger on June 13, 1922, on Can Body and Method of Producing Same. It will be realized that the invention is not necessarily limited to the type of side seam herein described, but that any type of side seam may be utilized, provided it has the necessary strength.

To provide for opening of the finished can, it may be desirable to provide the can body 10 with a removable tear strip 14 which is defined by a pair of parallel, circumferential score lines 16 and which terminates in a tear tongue 18 which projects laterally from the side seam 12 and is not bonded to the underlying body portion so that it may be engaged by a can opening key.

As the first step in the formation of the tapered, rectangular can body, the round, vertically walled body of FIG. 1 is stretched to produce the round, tapered shape of FIG. 2. In this form, the body 10 is still round in cross-section. However, the body has an downwardly tapering shape, as seen in FIG. 2, wherein the bottom end 20 of the body has the same diameter as it has in FIG. 1 but wherein the diameter increases progressively with the height of the body, so that the upper end 22 of the body 10 is of substantially greater diameter than the bottom end 20.

To produce this progressive increase in diameter, it is necessary that the metal of the body be subject to tensile elongation and actually stretched. In order to produce the desired round, tapered shape of FIG. 2, the diameter of the can body should be increased about 12½% at the top, or large end. The tensile elongation characteristics of modern tinplate are quite sufficient to permit the stretching of the metal necessary to provide this diametral increase. One type of tinplate presently used in can manufacture, designated as T2 plate under a load of about 600 pounds per square inch, is capable of being elongated up to 22%, which elongation is well in excess of the necessary elongation, and which provides an ample safety factor which is very desirable and necessary.

The actual stretching of the can body 10 should be as uniform as possible, in order to avoid subjecting any one portion of the body to an unduly severe load which might result in its tearing. One desirable way of obtaining this uniform stretching action is to utilize an internal expansion mandrel (not shown) which comprises a large number of individual rocking expander segments. The mandrel preferably is initially cylindrical in shape so that it fits rather snugly within the cylindrical body of FIG. 1. The segments are pivotally mounted at their bottom ends, and are actuated by a tapered wedge-type expansion plunger which is disposed for downward movement substantially axially of the body. When the plunger is actuated downwardly, it engages the inner cam surfaces of the expander segments and rocks these segments outwardly around their bottom pivot pins, thus stretching the can body 10 from the shape of FIG. 1 to the shape of FIG. 2. Because of the fact that the segments are pivoted at their bottom ends, their bottom ends do not move outwardly and so the bottom end 20 of the can body is not increased in diameter, but the diameter of the can is increased progressively until the maximum diameter at the upper end 22 of the body 10 is obtained.

As the next reshaping step of the invention, the round, tapered body of FIG. 2 is reformed to the desired, final configuration of FIG. 3 wherein the body is tapered vertically, and is substantially rectangular in cross-section, the corners 24 however being rounded as clearly seen in the drawing.

This operation entails no stretching of the metal, which would be undesirable in this step, since the necessity of producing the rounded corners and the flat sides would result in uneven stretching of the metal, but is merely a reforming operation which places little or no strain on the body. It may be readily effected in a number of different ways, as for example, by the use of an internal expansion unit (not shown) which may be referred to as a "squaring apparatus," which comprises four horizontally movable expander segments, each of which is formed with a can contacting surface which is shaped to produce one of the rounded corners 24 and the adjacent portions of the flat side walls of the body. The segments, in their initial position, are retracted sufficiently so that they are insertable into the can body 10 of FIG. 2 and are then moved radially by a downwardly movable expansion plunger away from each other to reform the body 10 to the shape of FIG. 3. The body 10 is preferably positioned relative to the "squaring" apparatus so that its side seam 12 is disposed in one of the straight flat walls of the reformed can body, as seen in FIG. 3.

If desired, external reforming molds (not shown) may be used to reform the body 10 from its shape of FIG. 2 to that of FIG. 3. Such molds may be utilized either alone, or in conjunction with the terminal expansion unit just described.

When the body 10 has been formed to the shape of FIG. 3, its top and bottom marginal edge portions are flanged outwardly to form marginal sealing flanges 26 (see FIG. 4), which are sufficiently rigid to positively hold the body in its final tapered, rectangular shape, and prevent it from assuring a more rounded cross-sectional configuration, which is its natural tendency.

This flanging operation is preferably done as soon as possible after the body has assumed the shape of FIG. 3, and may be done while the body 12 is still being held under the control of the "squaring" apparatus which reforms it to the shape of FIG. 3. However, this is not essential, and it is quite satisfactory that this flanging operation be effected in a separate flanging apparatus after the body has been released by the "squaring" apparatus. This flanging step completes the can body reshaping operation.

Thereafter, a countersunk bottom end member 28 may be secured to the flanged bottom end of the body 10 in a conventional double seam 30, and a product (not shown) packed into the body. The filled can is then finally closed and sealed by a countersunk top end member 32 which is secured in a conventional top double seam 34 to the flanged top end of the body 10.

As seen in FIG. 6, the overall increase in diameter of the top end of the body of FIG. 4 should preferably be sufficient in all dimensions to permit like cans made by the instant method invention to be stacked in interlocking engagement with the bottom end seam 30 of the top can 36 fitting into the top end seam 34 of the bottom can 38.

It will be understood that although illustrated form of the invention has been described as producing rectangular (including square) bodies, it is not limited to the production of rectangular bodies, but may be used to produce tapered bodies having cross-sectional shapes other than rectangular.

It is thought that the invention and many of its attendant advantages will be understood from the foregoing description and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

The method of forming a tapered can body, comprising the steps of forming from a rectangular sheet metal blank a cylindrical can body having a longitudinally extending side seam, stretching the metal of the body to progressively increase its diameter from one end to the other while retaining its circular cross-section to form a round tapered body, and reforming the round tapered body without stretching to a non-circular cross-sectional shape comprising straight sides.

References Cited in the file of this patent

UNITED STATES PATENTS

| | | |
|---|---|---|
| 2,390,553 | Pittner | Dec. 11, 1945 |
| 2,462,080 | Erb | Feb. 22, 1949 |
| 2,483,412 | Harker | Oct. 4, 1949 |

FOREIGN PATENTS

| | | |
|---|---|---|
| 388,668 | Germany | Jan. 17, 1924 |
| 764,601 | Great Britain | Dec. 28, 1956 |